United States Patent
Jiang (12)

(10) Patent No.: US 9,230,093 B1
(45) Date of Patent: Jan. 5, 2016

(54) PROTECTION METHOD AND SYSTEM FOR COMPUTER SECURITY

(71) Applicant: Celestica Technology Consultancy (Shanghai) Co., Ltd., Shanghai (CN)

(72) Inventor: Jiaping Jiang, Shanghai (CN)

(73) Assignee: CELESTICA TECHNOLOGY CONSULTANCY (SHANGHAI) CO., LTD., Shanghai (CN)

(*) Notice: Subject to any disclaimer, the term of this patent is extended or adjusted under 35 U.S.C. 154(b) by 0 days.

(21) Appl. No.: 14/512,926

(22) Filed: Oct. 13, 2014

(51) Int. Cl.
*G06F 21/51* (2013.01)
*G06F 21/45* (2013.01)

(52) U.S. Cl.
CPC ............... *G06F 21/45* (2013.01); *G06F 21/51* (2013.01)

(58) Field of Classification Search
None
See application file for complete search history.

(56) References Cited

U.S. PATENT DOCUMENTS

| | | | | | |
|---|---|---|---|---|---|
| 7,200,761 | B1* | 4/2007 | Freeman | ............. | G06F 11/2284 709/223 |
| 2004/0111633 | A1* | 6/2004 | Chang | ................... | G06F 21/572 726/28 |
| 2006/0010317 | A1* | 1/2006 | Lee | ....................... | G06F 21/572 713/2 |
| 2008/0077986 | A1* | 3/2008 | Rivera | .................... | G06F 21/34 726/20 |
| 2010/0268924 | A1* | 10/2010 | Fujii | ..................... | G06F 9/4401 713/1 |
| 2010/0299749 | A1* | 11/2010 | Bhansali | ............... | G06F 21/572 726/19 |

OTHER PUBLICATIONS

Lin et al, "Using TPM to Improve Boot Security at BIOS Layer", 2012, IEEE International Conference on Consumer Electronics (ICCE), p. 376-377.*
"SafeGuard pre-boot Authentication, Best Practices Whitepaper", Feb. 22, 2010, Sophos, Document Version 1.0, p. 1-8.*
Cruz et al, "Integration of PXE-based Desktop Solutions into Broadband Access Networks", 2010, 2010 International Conference on Network and Service Management—CNSM 2010, p. 182-189.*
Hu et al, "Design of Trusted BIOS in UEFI Based on USBKEY", 2011, 2011 International Conference on Intelligence Science and Information Engineering, p. 164-166.*
Bashun et al, "Too Young to be Secure: Analysis of UEFI Threats and Vulnerabilities", no date provided, Proceedings of the 14th Conference of Fruct Association, p. 16-24.*
Cooper et al, "BIOS Protection Guidelines, Recommendations of the National Institute of Standards and Technology", Apr. 2011, NIST Special Publication 800-147, p. 1-26.*

* cited by examiner

*Primary Examiner* — Christopher Revak
(74) *Attorney, Agent, or Firm* — Novak Druce Connolly Bove + Quigg LLP

(57) ABSTRACT

Provided is a protection method and system for computer security. The protection method for computer security includes the steps of storing portable storage device information in the portable storage device as a first password; storing the first password in BIOS firmware; generating a second password and storing the second password in the portable storage device and the BIOS firmware; and comparing the first password and second password of the portable storage device with those of the BIOS firmware. Accordingly, protection for computer security can be achieved. According to the present invention, a password is not required to remember. It is unnecessary to install any device drivers. Computer security and a user's identity can be protected simultaneously, and no additional chip or device is required to achieve password authentication. Therefore, the present invention can simplify the protection steps, reduce costs, and enhance the performance of computer security protection.

9 Claims, 6 Drawing Sheets

PROTECTION METHOD AND SYSTEM FOR COMPUTER SECURITY

BACKGROUND OF THE INVENTION

1. Field of the Invention

The present invention relates generally to a protection method and system for computer security, and more particularly, to a protection method and system for computer security by utilizing a Basic Input Output System (BIOS) and a portable storage device.

2. the Prior Arts

With the extensive applications of computer technology in life and work, computer security issues have gained much attention. Traditional protection method for computer security requires setting up a BIOS password, logging in a password to gain access to a system, and so on. However, although the use of passwords may confirm a user's identity, confidentiality and protection of setting up a BIOS password and logging in a password to gain access to a system may be weaken. In addition, passwords may be cracked by many password cracking methods. The method of logging in a password to confirm a user's identity is not secure.

Moreover, a portable storage device such as a Universal Serial Bus (USB) flash drive containing a bootable portable operating system may be used to provide computer security protection. A USB flash drives is a data storage device including flash memory, reader and writer with an integrated USB interface. The portable storage device contains password encryption that is designed in a chip to confirm the user's identity. Accordingly, the performance of computer security protection may be improved by the encrypted secure portable storage device. However, the portable storage device is required to pre-install device drivers.

In addition to the above computer security protection method, the Trusted Platform Module (TPM) technology is a standard for a secure cryptoprocessor that is a microprocessor designed to secure a computer by integrating cryptographic keys into devices. As such, the performance of computer security protection may also be improved by the TPM technology. However, the user's identity may not be confirmed by such TPM technology.

Further, a BIOS electromagnetic lock may be used to enhance computer security protection and confirm a user's identity. The BIOS electromagnetic lock is connected to a motherboard of a computer, and includes an electromagnetic lock and a smart sensor. The BIOS electromagnetic lock may lock the computer internally by controlling a computer case. Additionally, the computer may be unlocked through the Internet and pre-setting a BIOS password. Therefore, the electromagnetic lock may be preset up by the BIOS with a view to controlling the state of the electromagnetic lock.

In summary, some problems with regard to computer security protection required to be solved are as follows:

1. A user's identity is confirmed only by logging in a password. The password may be cracked easily, thereby being less secure.

2. It is necessary to install device drivers when using a portable storage device.

3. Computer security and a user's identity cannot be protected simultaneously.

4. Additional chips or device are required to achieve password authentication, thereby increasing costs.

Accordingly, solutions to the problems described above have been long sought, but prior developments have not taught or suggested any solutions and, thus, solutions to the problems have long eluded those skilled in the art. Therefore, there is a heretofore-unaddressed need to overcome defects and shortcomings described above.

SUMMARY OF THE INVENTION

In light of the foregoing drawbacks, an objective of the present invention is to provide a protection method and system for computer security, thereby overcoming the problems that a password is required to remember, it is necessary to install device drivers of a portable storage device, computer security and a user's identity cannot be protected simultaneously, and additional chips or devices are required to achieve password authentication.

For achieving the foregoing objective, the present invention provides a protection method for computer security, including the steps of: 1) detecting a portable storage device that is connected to a computer via a communication interface and booting the computer via the communication interface; 2) determining the portable storage device as a bootable storage device; 3) reading portage storage device information from the portable storage device as a first password and storing the first password in BIOS firmware; 4) randomly generating a second password and storing the second password in the portable storage device and the BIOS firmware; 5) sending a first request to the portable storage device after finishing power-on self-test (POST) by booting the computer and before an operating system is loaded; 6) reading the portable storage device information from the portable storage device and determine whether the portable storage device information is equal to the first password stored in the BIOS firmware, wherein if the portable storage device information is equal to the first password stored in the BIOS firmware, the computer continues to boot; if the portable storage device information and the first password stored in BIOS firmware are unequal, a second request is sent to the portable storage device; and 7) reading the second password of the portable storage device after the portable storage device information of the portable storage device is equal to the first password of the BIOS firmware, comparing the second password of the portable storage device with the second password of the BIOS firmware, and loading the operating system if the second password of the portable storage device is equal to the second password of the BIOS firmware.

Preferably, the portable storage device information includes a serial number and/or manufacturer's information of the portable storage device, according to the present invention.

Preferably, the step 4) further includes the steps of randomly generating a second password that is stored in the BIOS firmware; generating a third password by encrypting the second password by means of an encryption method; and storing the third password in the portable storage device; and the step 7) further includes the steps of reading the third password of the portable storage device after the portable storage information is equal to the first password of the BIOS firmware; generating a fourth password by decrypting the third password by means of a decryption method; comparing the fourth password and the second password of the BIOS firmware; loading the operating system if the fourth password is equal to the second password of the BIOS firmware; and displaying error information and sending a third request to the portable storage device if the fourth password is unequal to the second password of the BIOS firmware, according to the present invention.

Preferably, the encryption method and the decryption method may be asymmetric algorithms, according to the present invention.

The present invention further provides a protection method for computer security, including: a detection module detecting a portable storage device that is connected to a computer via a communication interface; a read module connected to the detection module and reading portable storage device information from the portable storage device and information from BIOS firmware after the detection module detects the portable storage device; a password management module connected to the read module, setting the portable storage device information of the portable storage device as a first password stored in the BIOS firmware and randomly generate a second password stored in the portable storage device and the BIOS firmware; a security management module connected to the read module and determining whether the portable storage device information of the portable storage device is equal to the first password stored in the BIOS firmware after finishing power-on self-test (POST) by booting the computer and before an operating system is loaded, wherein if the portable storage device information of the portable storage device is equal to the first password stored in the BIOS firmware, the second password read by the read module is compared with the second password stored in the BIOS firmware, and wherein if the second password read by the read module is equal to the second password stored in the BIOS firmware, the operating system is loaded.

Preferably, the password management module further includes an encryption processing unit setting the portable storage device information of the portable storage device as the first password stored in the BIOS firmware, randomly generating the second password stored in the BIOS firmware, and encrypting the second password to generate a third password that is stored in the portable storage device by an encryption method; and a decryption processing unit decrypting the third password that is stored in the portable storage device to generate a fourth password by a decryption method, according to the present invention.

Preferably, the security management module is connected to the read module, and determines whether the portable storage device information of the portable storage device is equal to the first password stored in the BIOS firmware, wherein if the portable storage device information of the portable storage device is equal to the first password stored in the BIOS firmware, the fourth password read by the read module is compared with the second password stored in the BIOS firmware, and wherein if the fourth password is equal to the second password stored in the BIOS firmware, the operating system is loaded.

Preferably, the detection module, the read module, the password management module and the security management module are embedded in the BIOS firmware, according to the present invention.

Preferably, the portable storage device may be a U disk or a portable hard disk, according to the present invention.

As described, the protection method and system for computer security of the present invention has the following advantages. Passwords are not required to remember. Computer security protection and a user's identity prior to being granted access can be authenticated or verified simultaneously. It is unnecessary to install any device drivers. Moreover, no additional chip or device is required to achieve password authentication. Therefore, the present invention can simplify the protection steps, reduce costs, and enhance the performance of computer security protection.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
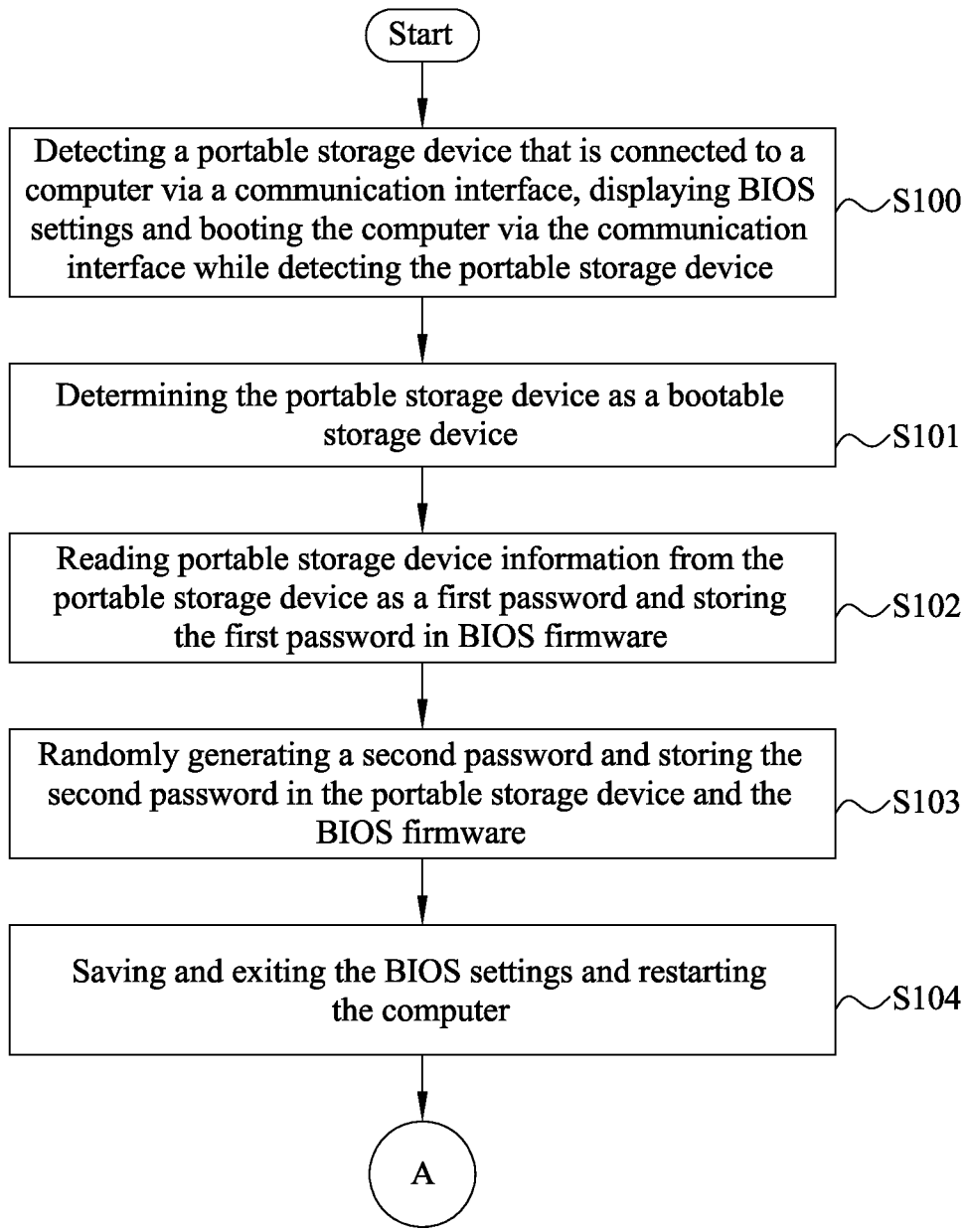
FIG. 1 is a flow chart illustrating a protection method for computer security according to an embodiment of the present invention.
Figure 1:
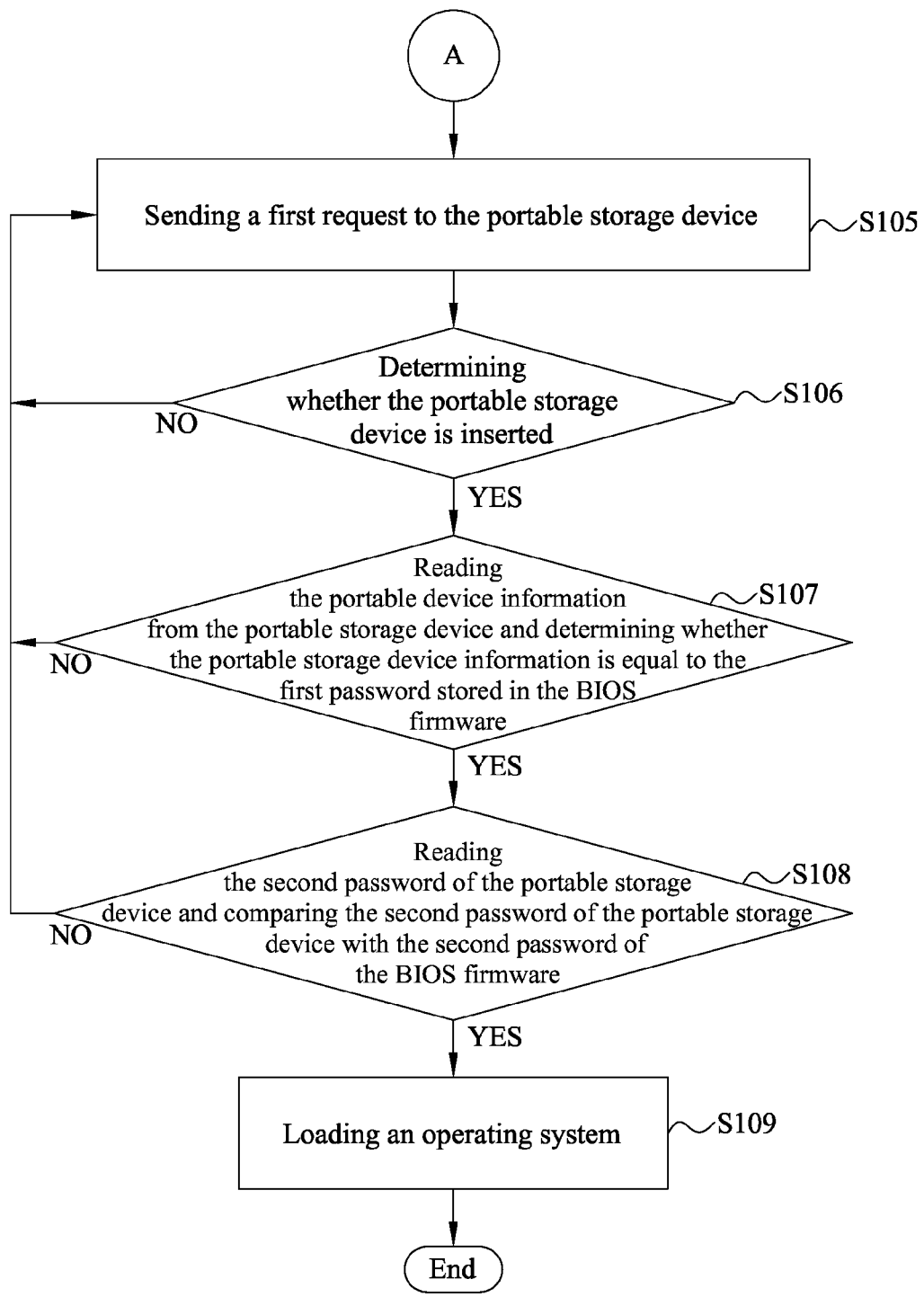

With regard to FIGS. 1-4, the drawings showing embodiments are semi-diagrammatic and not to scale and, particularly, some of the dimensions are for clarity of presentation and are shown exaggerated in the drawings. Similarly, although the views in the drawings for ease of description generally show similar orientations, this depiction in the drawings is arbitrary for the most part. Generally, the present invention can be operated in any orientation Referring to FIG. 1, a flow chart of a protection method for computer security is illustrated in accordance with an embodiment of the present invention. As shown in FIG. 1, in the embodiment of the present invention, the protection method for computer security includes the steps of:

S100: detecting a portable storage device that is connected to a computer via a communication interface, displaying BIOS settings and booting the computer via the communication interface while detecting the portable storage device;

S101: determining the portable storage device as a bootable storage device;

S102: reading portable storage device information from the portable storage device as a first password and storing the first password in BIOS firmware;

S103: randomly generating a second password and storing the second password in the portable storage device and the BIOS firmware;

S104: saving and exiting the BIOS settings and restarting the computer;

S105: sending a first request to the portable storage device after finishing power-on self-test (POST) by booting the computer and before an operating system is loaded;

S106: determining whether the portable storage device is inserted, performing step S105 if no portable storage device is inserted and performing step S107 if the portable storage device is inserted;

S107: reading the portable device information from the portable storage device and determining whether the portable storage device information is equal to the first password stored in the BIOS firmware, wherein if the portable storage device information is equal to the first password stored in the BIOS firmware, step S108 is performed; if the portable storage device information and the first password stored in the BIOS firmware are unequal, step S105 is performed;

S108: reading the second password of the portable storage device, comparing the second password of the portable storage device with the second password of the BIOS firmware, and performing step S109 of loading the operating system if the second password of the portable storage device is equal to the second password of the BIOS firmware, otherwise performing step S105 if the second password of the portable storage device and the second password of the BIOS firmware are unequal.

According to an embodiment of the present invention, the portable storage device used as a bootable storage device includes two pieces of information for computer security protection: portable storage device information of the portable storage device and a password (i.e., the second password) randomly generated by the computer. The BIOS firmware of the protected computer also stores a first password and a second password corresponding to the first password and the second password of the portable storage device, respectively. According to the embodiment of the present invention, the BIOS firmware is integrated in the computer such that it is difficult to crack the passwords stored in the BIOS firmware. Moreover, each portable storage device includes a unique serial number. Even though the portable storage devices having the same model manufactured by the same manufacturer are connected to the protected computer, the first password stored in the BIOS firmware are only equal to the unique serial number of a portable storage device that is initially set as a first password. If the unique serial number of the portable storage device is used in other applications or the portable storage device stores information about the manufacturer, the present invention may further compare the second password stored in the BIOS firmware with the second password of the portable storage device so as to provide double computer security protection. In addition, the portable storage device can be used as a common portable storage device even though the passwords are stored in the portable storage device.

The protection method for computer security of the present invention does not require users to remember passwords. According to the embodiment of the present invention, it is unnecessary to install any device drivers. Moreover, no additional chip or device is required to achieve password authentication. Accordingly, a user's identity prior to being granted access can be authenticated or verified by the protection method for computer security of the present invention.

Figure 2:
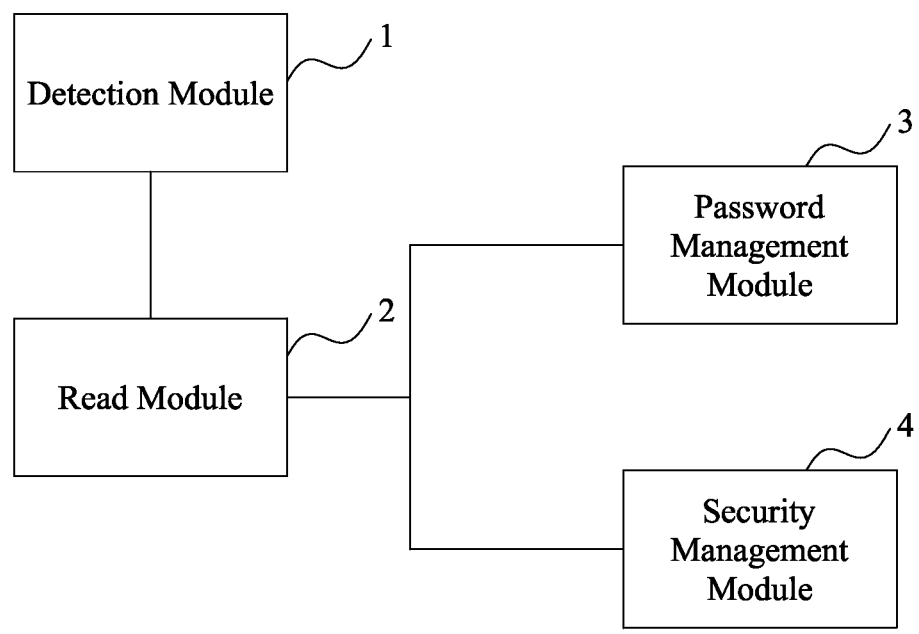
FIG. 2 is a block diagram showing a protection system for computer security according to an embodiment of the present invention.

FIG. 2 shows a block diagram of a protection system for computer security according to an embodiment of the present invention. As shown in FIG. 2, the protection method for computer security can be realized by the protection system. The protection system for computer security of the present invention includes a detection module 1, a read module 2, a password management module 3 and security management module. These modules are embedded in the BIOS firmware.

According to the present invention, the detection module 1 detects a portable storage device that is connected to a computer via a communication interface.

The read module is connected to the detection module. While the detection module detects the portable storage device, the read module reads information from the portable storage device and information from BIOS firmware.

The password management module 3 is connected to the read module, sets the information of the portable storage device as a first password stored in the BIOS firmware, and randomly generates a second password stored in the portable storage device and the BIOS firmware.

In the embodiment of the present invention, the information of the portable storage device includes portable storage device information and a second password. For example, the portable storage device information includes a serial number and/or manufacturer's information of the portable storage device. Besides, the information of the BIOS firmware includes a first password and a second password.

The security management module is connected to the read module, and determines whether the portable storage device information of the portable storage device is equal to the first password stored in the BIOS firmware after finishing power-on self-test (POST) by booting the computer and before an operating system is loaded. If the portable storage device information of the portable storage device is equal to the first password stored in the BIOS firmware, the second password read by the read module is compared with the second password stored in the BIOS firmware. If the second password read by the read module is equal to the second password stored in the BIOS firmware, the operating system is loaded.

Figure 3:
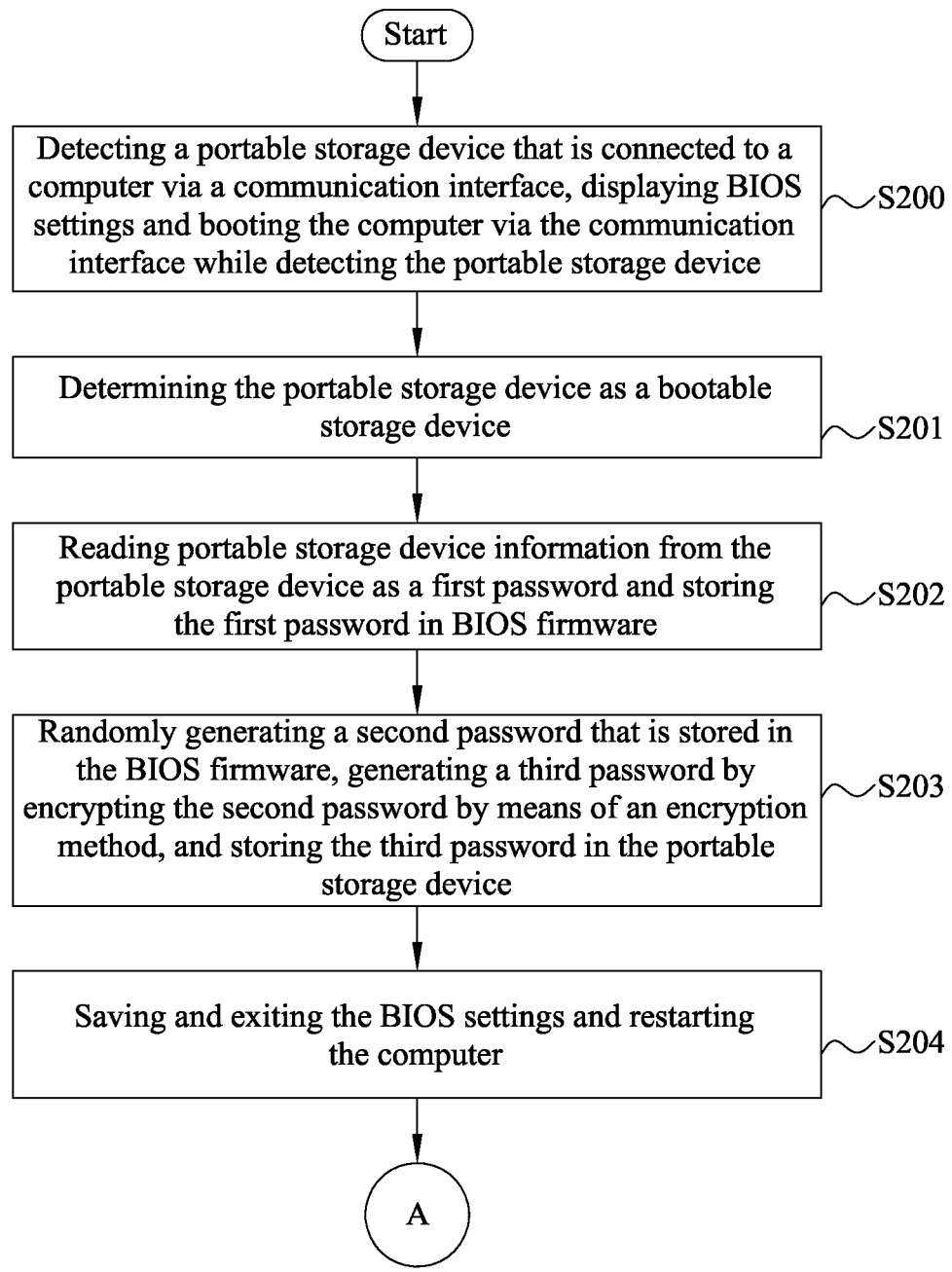
FIG. 3 is a flow chart illustrating the protection method for computer security according to another embodiment of the present invention.
Figure 3:
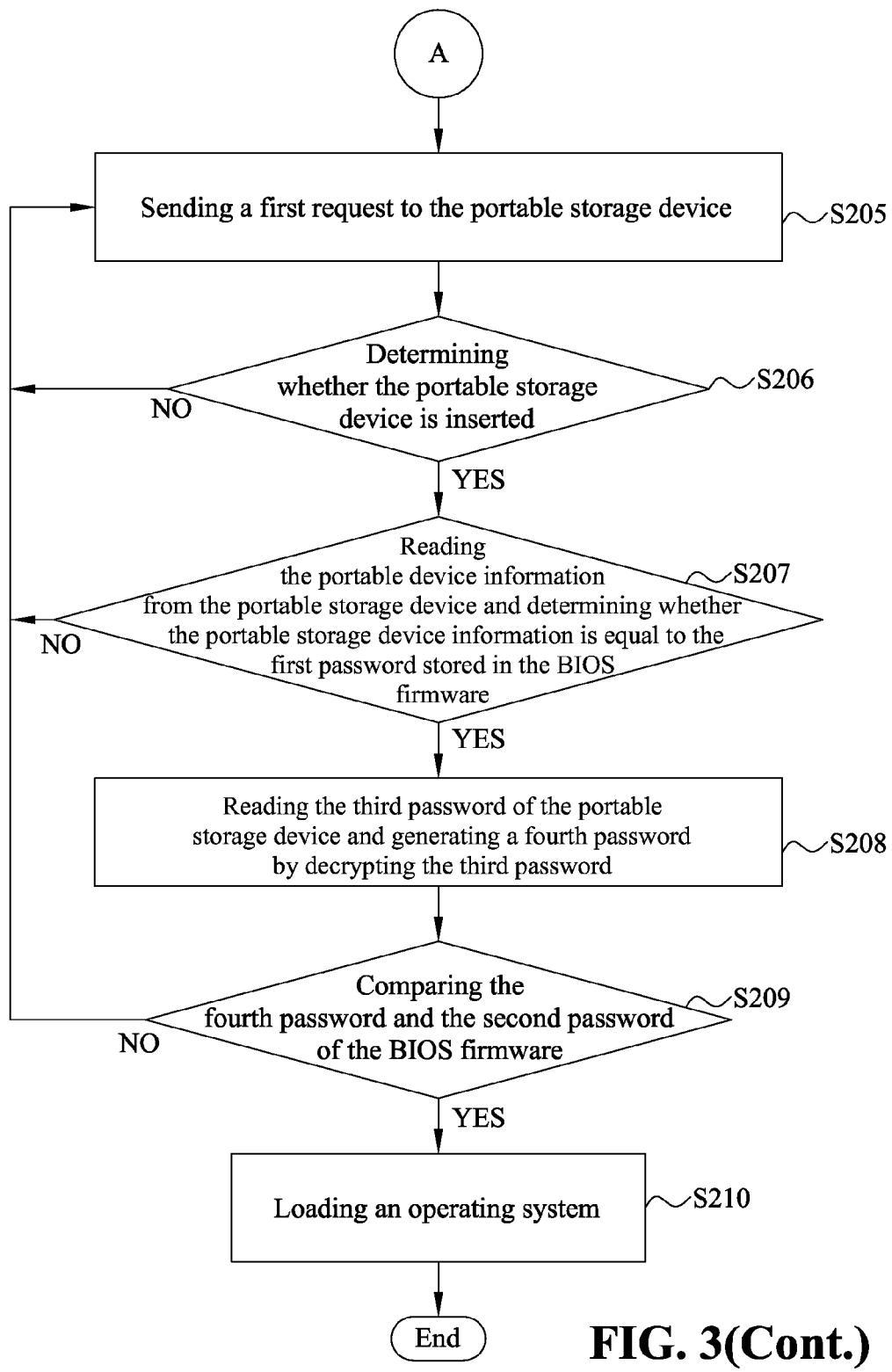

As such, computer security is protected based on the protection method for computer security of the present invention. Further, as shown in FIG. 3, a flow chart of the protection method for computer security is illustrated according to another embodiment of the present invention. In another embodiment of the present invention, the protection method for computer security includes the steps of:

S200: detecting a portable storage device that is connected to a computer via a communication interface, displaying BIOS settings and booting the computer via the communication interface while detecting the portable storage device;

S201: determining the portable storage device as a bootable storage device;

S202: reading portable storage device information from the portable storage device as a first password and storing the first password in BIOS firmware;

S203: randomly generating a second password that is stored in the BIOS firmware, generating a third password by encrypting the second password by means of an encryption method, and storing the third password in the portable storage device;

S204: saving and exiting the BIOS settings and restarting the computer;

S205: sending a first request to the portable storage device after finishing power-on self-test (POST) by booting the computer and before an operating system is loaded;

S206: determining whether the portable storage device is inserted, performing step S205 if no portable storage is inserted and performing step S207 if the portable storage device is inserted;

S207: reading the portable device information from the portable storage device and determining whether the portable storage device information is equal to the first password stored in the BIOS firmware, wherein if the portable storage device information is equal to the first password stored in the BIOS firmware, step S208 is performed; if the portable storage device information and the first password stored in the BIOS firmware are unequal, step S205 is performed;

S208: reading the third password of the portable storage device and generating a fourth password by decrypting the third password by means of a decryption method;

S209: comparing the fourth password and the second password of the BIOS firmware, loading the operating system if the fourth password is equal to the second password of the BIOS firmware, and displaying error information and sending a third request to the portable storage device if the fourth password is unequal to the second password of the BIOS firmware.

In another embodiment of the present invention, the encryption method and the decryption method may be asymmetric algorithms. In practice, the present invention is not limited to the asymmetric algorithms. Accordingly, computer security can be further protected based on generating a third password by encrypting the second password, storing the third password in the portable storage device, reading the third password of the portable storage device, generating a fourth password and comparing the fourth password and the second password of the BIOS firmware.

Figure 4:
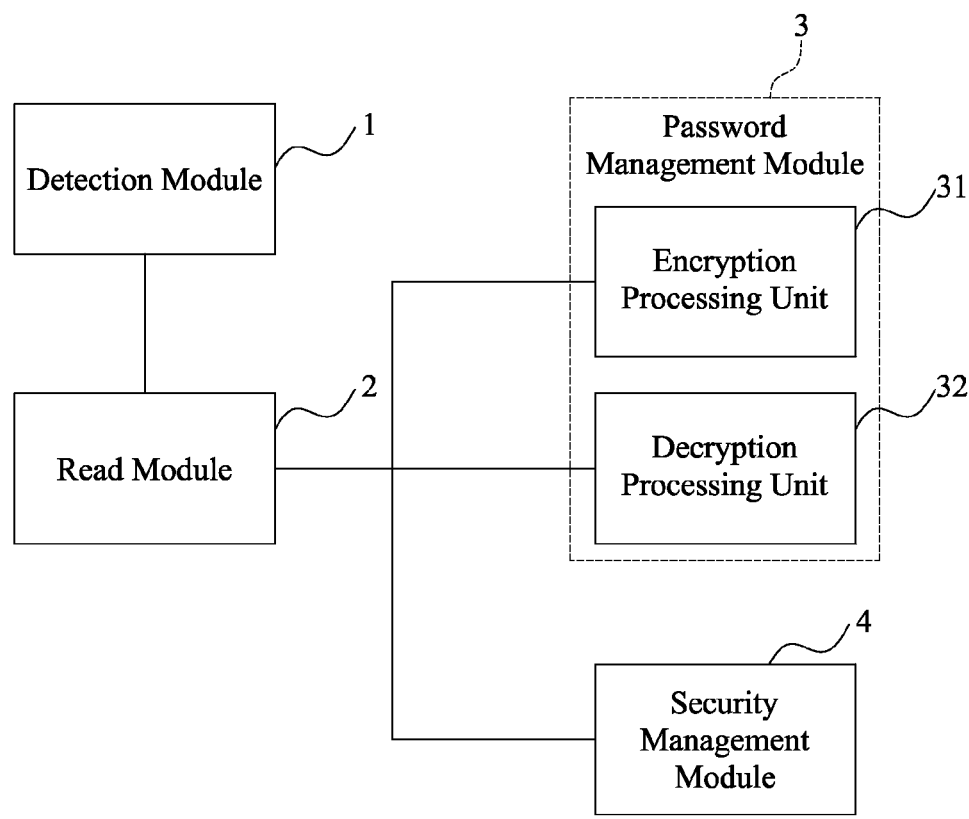
FIG. 4 is a block diagram showing the protection system for computer security according to another embodiment of the present invention.

Referring FIG. 4, a block diagram of the protection system for computer security is illustrated according to another embodiment of the present invention. As shown in FIG. 4, according to another embodiment of the present invention, the protection system for computer security includes a detection module 1, a read module 2, a password management module 3 and a security management module 4. In another embodiment of the present invention, the password management module 3 further includes an encryption processing unit 31 and a decryption processing unit 32 that are connected to the read module 2.

The read module 2 is connected to the detection module 1, and reads portable storage device information from the portable storage device and information from BIOS firmware after the detection module detects the portable storage device.

The encryption processing unit 31 sets the portable storage device information of the portable storage device read by the read module 2 as the first password stored in the BIOS firmware, randomly generates the second password stored in the BIOS firmware, and encrypts the second password to generate a third password that is stored in the portable storage device by an encryption method.

The decryption processing unit 32 the third password that is stored in the portable storage device to generate a fourth password by a decryption method.

In another embodiment of the present invention, the information of the portable storage device read by the read module 2 includes portable storage device information and the third password. Moreover, the portable storage device information further includes a serial number and/or manufacturer's information of the portable storage device. The information of the BIOS firmware includes the first password and the second password.

The security management module 4 is connected to the read module 2, and determines whether the portable storage device information of the portable storage device is equal to the first password stored in the BIOS firmware after finishing power-on self-test (POST) by booting the computer and before an operating system is loaded. If the portable storage device information of the portable storage device is equal to the first password stored in the BIOS firmware, the fourth password read by the read module is compared with the second password stored in the BIOS firmware. If the fourth password read by the read module is equal to the second password stored in the BIOS firmware, the operating system is loaded.

In the above embodiments of the present invention, the portable storage device may be a U disk or a portable hard disk. The portable storage device information includes a serial number and/or manufacturer's information of the portable storage device. The present invention is not limited to the U disk, the portable hard disk and the serial number and/or manufacturer's information of the portable storage device.

In summary, the present invention provides a protection method and system for computer security. The portable storage device information and the password stored in the portable storage device are compared with the first password and the second password stored in the BIOS firmware, respectively, without remembering any password. According to the present invention, it is unnecessary to install any device drivers. Additionally, no additional chip or device is required to achieve password authentication. As such, the present invention valuably supports and services the trend of simplifying the protection steps, reducing costs, and enhancing the performance of computer security protection. Therefore, the present invention overcomes deficiencies and shortcomings described above.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A protection method for computer security, comprising the steps of:
   1) detecting a portable storage device that is connected to a computer via a communication interface and booting the computer via the communication interface;
   2) determining the portable storage device as a bootable storage device;
   3) reading portable storage device information from the portable storage device as a first password and storing the first password in Basic Input Output System (BIOS) firmware;
   4) randomly generating a second password and storing the second password in the portable storage device and the BIOS firmware;
   5) sending a first request to the portable storage device after finishing power-on self-test (POST) by booting the computer and before an operating system is loaded;
   6) reading the portable storage device information from the portable storage device and determining whether the portable storage device information is equal to the first password stored in the BIOS firmware, wherein if the portable storage device information is equal to the first password stored in the BIOS firmware, the computer continues to boot; if the portable storage device information and the first password stored in the BIOS firmware are unequal, a second request is sent to the portable storage device; and
   7) reading the second password of the portable storage device after the portable storage device information of the portable storage device is equal to the first password of the BIOS firmware, comparing the second password of the portable storage device with the second password of the BIOS firmware, and loading the operating system if the second password of the portable storage device is equal to the second password of the BIOS firmware.

2. The protection method for computer security according to claim 1, wherein the portable storage device information comprises a serial number and/or manufacturer's information of the portable storage device.

3. The protection method for computer security according to claim 1, wherein the step 4) further comprises the steps of: randomly generating a second password that is stored in the BIOS firmware; generating a third password by encrypting the second password by means of an encryption method; and storing the third password in the portable storage device, and the step 7) further comprises the steps of: reading the third password of the portable storage device after the portable storage information is equal to the first password of the BIOS firmware; generating a fourth password by decrypting the third password by means of a decryption method; comparing the fourth password and the second password of the BIOS firmware; loading the operating system if the fourth password is equal to the second password of the BIOS firmware; and displaying error information and sending a third request to the portable storage device if the fourth password is unequal to the second password of the BIOS firmware.

4. The protection method for computer security according to claim 3, wherein the encryption method and the decryption method are asymmetric algorithms.

5. A protection system for computer security, comprising:
- a detection module detecting a portable storage device that is connected to a computer via a communication interface;
- a read module connected to the detection module and reading portable storage device information from the portable storage device and information from BIOS firmware after the detection module detects the portable storage device;
- a password management module connected to the read module, setting the portable storage device information of the portable storage device as a first password stored in the BIOS firmware and randomly generate a second password stored in the portable storage device and the BIOS firmware;
- a security management module connected to the read module and determining whether the portable storage device information of the portable storage device is equal to the first password stored in the BIOS firmware after finishing power-on self-test (POST) by booting the computer and before an operating system is loaded, wherein if the portable storage device information of the portable storage device is equal to the first password stored in the BIOS firmware, the second password read by the read module is compared with the second password stored in the BIOS firmware, and wherein if the second password read by the read module is equal to the second password stored in the BIOS firmware, the operating system is loaded.

6. The protection system for computer security according to claim 5, wherein the password management module further comprises:
- an encryption processing unit setting the portable storage device information of the portable storage device read by the read module as the first password stored in the BIOS firmware, randomly generating the second password stored in the BIOS firmware, and encrypting the second password to generate a third password that is stored in the portable storage device by an encryption method; and
- a decryption processing unit decrypting the third password that is stored in the portable storage device to generate a fourth password by a decryption method.

7. The protection system for computer security according to claim 6, wherein the security management module is connected to the read module, and determines whether the portable storage device information of the portable storage device is equal to the first password stored in the BIOS firmware, wherein if the portable storage device information of the portable storage device is equal to the first password stored in the BIOS firmware, the fourth password read by the read module is compared with the second password stored in the BIOS firmware, and wherein if the fourth password is equal to the second password stored in the BIOS firmware, the operating system is loaded.

8. The protection system for computer security according to claim 7, wherein the detection module, the read module, the password management module and the security management module are embedded in the BIOS firmware.

9. The protection system for computer security according to claim 5, wherein the portable storage device is a U disk or a portable hard disk.

\* \* \* \* \*